(12) United States Patent
Klein

(10) Patent No.: US 7,742,980 B1
(45) Date of Patent: Jun. 22, 2010

(54) AUTOMATED LOAN APPROVAL SYSTEM

(75) Inventor: Lawrence Klein, Long Beach, NY (US)

(73) Assignee: IMX, Inc., San Jose, CA (US)

( * ) Notice: Subject to any disclaimer, the term of this patent is extended or adjusted under 35 U.S.C. 154(b) by 2003 days.

(21) Appl. No.: 10/298,252

(22) Filed: Nov. 15, 2002

(51) Int. Cl.
*G06Q 40/00* (2006.01)

(52) U.S. Cl. .......................................... 705/38; 705/39

(58) Field of Classification Search .............. 705/38–39
See application file for complete search history.

(56) References Cited

U.S. PATENT DOCUMENTS

| | | | |
|---|---|---|---|
| 3,596,256 | A | 7/1971 | Alpert et al. |
| 4,186,438 | A | 1/1980 | Benson et al. |
| 4,346,442 | A | 8/1982 | Musmanno |
| 4,736,294 | A | 4/1988 | Gill et al. |
| 4,750,119 | A | 6/1988 | Cohen et al. |
| 4,774,664 | A | 9/1988 | Campbell et al. |
| 4,799,156 | A | 1/1989 | Shavit et al. |
| 4,831,526 | A | 5/1989 | Luchs et al. |
| 4,876,648 | A | 10/1989 | Lloyd |
| 4,916,611 | A | 4/1990 | Doyle, Jr. et al. |
| 4,989,141 | A | 1/1991 | Lyons et al. |
| 4,994,964 | A | 2/1991 | Wolfberg et al. |
| 5,136,501 | A | 8/1992 | Silverman et al. |
| 5,218,539 | A | 6/1993 | Elphick et al. |
| 5,231,571 | A | 7/1993 | D'Agostino |
| 5,239,462 | A | 8/1993 | Jones et al. |
| 5,274,547 | A | 12/1993 | Zoffel et al. |
| 5,297,031 | A | 3/1994 | Gutterman et al. |
| 5,323,315 | A | 6/1994 | Highbloom |
| 5,375,055 | A | 12/1994 | Togher et al. |
| 5,383,113 | A | 1/1995 | Kight et al. |
| 5,414,837 | A | 5/1995 | Kotatsu |
| 5,500,793 | A | 3/1996 | Deming et al. |
| 5,508,913 | A | 4/1996 | Yamamoto et al. |
| 5,535,407 | A | 7/1996 | Yanagawa et al. |
| 5,560,005 | A | 9/1996 | Hoover et al. |
| 5,561,797 | A | 10/1996 | Gilles et al. |
| 5,584,025 | A | 12/1996 | Keithly et al. |
| 5,592,375 | A | 1/1997 | Salmon et al. |
| 5,611,052 | A | 3/1997 | Dykstra |
| 5,644,726 | A | 7/1997 | Oppenheimer |

(Continued)

FOREIGN PATENT DOCUMENTS

WO 0109787 2/2001

(Continued)

OTHER PUBLICATIONS

Thinakal, Sadu. "The Business of Internet Lending." Mortgage Banking, Oct. 1996, pp. 131-134, vol. 57, No. 1.

(Continued)

*Primary Examiner*—Thu Thao Havan
(74) *Attorney, Agent, or Firm*—Swernofsky Law Group PC

(57) ABSTRACT

The invention provides a method and system capable of automatic loan approval, in which lenders can both provide information to brokers regarding their loan policies, and in which brokers can obtain information regarding likely lender treatment of prospective borrowers. Thus, brokers search a database of possible loan programs made available by lenders, rather than lenders searching a database of possible loans made available by brokers.

14 Claims, 2 Drawing Sheets

U.S. PATENT DOCUMENTS

| | | | |
|---|---|---|---|
| 5,659,731 A | 8/1997 | Gustafson | |
| 5,699,527 A | 12/1997 | Davidson | |
| 5,701,451 A | 12/1997 | Rogers et al. | |
| 5,706,434 A | 1/1998 | Kremen et al. | |
| 5,708,825 A | 1/1998 | Sotomayor | |
| 5,710,889 A | 1/1998 | Clark et al. | |
| 5,732,400 A | 3/1998 | Mandler et al. | |
| 5,749,077 A | 5/1998 | Campbell | |
| 5,754,850 A | 5/1998 | Janssen | |
| 5,765,144 A | 6/1998 | Larche et al. | |
| 5,774,883 A | 6/1998 | Andersen et al. | |
| 5,794,207 A | 8/1998 | Walker et al. | |
| 5,797,133 A | 8/1998 | Jones et al. | |
| 5,809,478 A | 9/1998 | Greco et al. | |
| 5,809,484 A | 9/1998 | Mottola et al. | |
| 5,819,230 A | 10/1998 | Christie et al. | |
| 5,820,386 A | 10/1998 | Sheppard, II | |
| 5,845,265 A | 12/1998 | Woolston | |
| 5,870,721 A | 2/1999 | Norris | |
| 5,878,403 A | 3/1999 | DeFrancesco et al. | |
| 5,897,621 A | 4/1999 | Boesch et al. | |
| 5,904,812 A | 5/1999 | Salman et al. | |
| 5,907,828 A | 5/1999 | Meyer et al. | |
| 5,924,082 A | 7/1999 | Silverman et al. | |
| 5,930,776 A | 7/1999 | Dykstra et al. | |
| 5,940,811 A | 8/1999 | Norris | |
| 5,940,812 A | 8/1999 | Tengel et al. | |
| 5,966,699 A | 10/1999 | Zandi | |
| 5,987,434 A | 11/1999 | Libman | |
| 5,995,947 A | 11/1999 | Fraser et al. | |
| 5,999,908 A | 12/1999 | Abelow | |
| 6,012,047 A | 1/2000 | Mazonas et al. | |
| 6,014,627 A | 1/2000 | Togher et al. | |
| 6,014,643 A | 1/2000 | Monton | |
| 6,014,645 A | 1/2000 | Cunningham | |
| 6,029,149 A | 2/2000 | Dykstra et al. | |
| 6,049,784 A | 4/2000 | Weatherly et al. | |
| 6,058,378 A | 5/2000 | Clark et al. | |
| 6,064,986 A | 5/2000 | Edelman | |
| 6,067,533 A | 5/2000 | McCauley et al. | |
| 6,088,686 A | 7/2000 | Walker et al. | |
| 6,105,007 A | 8/2000 | Norris | |
| 6,208,979 B1 | 3/2001 | Sinclair | |
| 6,289,319 B1 | 9/2001 | Lockwood | |
| 6,324,524 B1 | 11/2001 | Lent et al. | |
| 6,385,594 B1 | 5/2002 | Lebda et al. | |
| 5,870,721 C1 | 1/2003 | Norris | |
| 6,505,176 B2 | 1/2003 | DeFrancesco, Jr. et al. | |
| 6,587,841 B1 | 7/2003 | DeFrancesco, Jr. et al. | |
| 6,603,487 B1 | 8/2003 | Bennett et al. | |
| 6,682,422 B1 * | 1/2004 | Walker et al. | 463/25 |
| 2002/0138414 A1 * | 9/2002 | Baker, IV | 705/38 |
| 2003/0033241 A1 * | 2/2003 | Harari | 705/38 |
| 2006/0190394 A1 | 8/2006 | Fraser et al. | |

FOREIGN PATENT DOCUMENTS

WO    WO 01/09787 A2    2/2001

OTHER PUBLICATIONS

United States Court of Appeals for the Federal Circuit. "*Kraft Foods, Inc., plaintiff-appellant*, v. *International Trading Company and Houston Processing LTD., defendants-appellees.*" Federal Circuit, Feb. 14, 2000, pp. 1-11, No. 99-1240.

Bulan, Inc. "Mortrade: The First Interactive Mortgage Trading Network." How-To Manual, Dec. 1990, Release 2.0.

Bulan, Inc. "Mortrade: The First Interactive Mortgage Trading Network." Users Manual, Dec. 1990, Release 2.0.

Colby. "Gearing Up for the Next Round of Mortgage Lending Scrutiny." Bank Management, Apr. 1993, pp. 46-52.

Contour Software, Inc. "Advanced Technologies Department Technical Specifications for EDI Interfaces." Jul. 12, 1996, pp. 1-47.

Contour Software, Inc. "The Loan Handler." 1993, pp. 1-259.

Contour Software, Inc. "The Loan Handler for Windows." 1998, pp. 1-232, version 4.2, third edition.

Contour Software, Inc. "The Loan Tracker for Windows." 1995, pp. 1-181, version 4.0.

Cooley. "Hanging on for a Wild Ride." National Mortgage Broker, Feb. 1995, vol. 11, No. 2.

Cooley. "Sizing Up the New Networks." Mortgage Banking, Dec. 1994, pp. 38-45.

GHR Services, Inc. "How to Use MARS POS." Jun. 7, 1990.

GHR Services, Inc. "MARS System Administration." 1994, GHR Services, Inc.

GHR Systems, Inc. "Counseling the Buyer and Completing the Mortgage Application: MARS Point of Sale Training Guide." 1994.

GHR Systems, Inc. "MARS Back Office." May 1, 1995.

GHR Systems, Inc. "MARS Point of Sale (POS) Reference Manual." 1994, version 3.0.

Harker et al. "A Market-Based Approach to Workflow Automation." Departments of Systems Engineering and Computer and Information Science, University of Pennsylvania, Aug. 1996, pp. 108-113.

Lebowitz. "Marketing Mortgages on MARS." Mortgage Banking, Nov. 1992, pp. 51-59.

Meyer et al. "Agricultural Lenders' Diagnostic System (ALDS)." Computers and Electronics in Agriculture, Apr. 7, 1992, pp. 1-12, Elsevier Science Publishers B.V., Amsterdam.

ORD. "Canada's Electronic Mortgage Market." Mortgage Originator, Jul. 1996, pp. 16-18.

Reinbach. "The Bidding Wars: Mortgage Exchanges Force Commoditization." Bank System Technology, Nov. 1996, pp. 32-34.

Thinakal. "The Business of Internet Lending." Mortgage Banking, Oct. 1996, pp. 131-134, vol. 57, No. 1.

United States District Court. "*IMX, Inc.* v. *Lendingtree, LLC.*" 03-1067-SLR, May 1, 2005, pp. 1-3.

GHR Systems, Inc. "Business Plan." Dec. 1993, pp. 1-19.

Cooley. "Selling Loans in Cyberspace." Mortgage Banking, Dec. 1995.

GHR Systems, Inc. "Sep. 1994 State Real Estate Conventions Exhibit Participation by GHR." No date. pp. 1-3.

Contour Software, Inc. "Contour Continues Growth Cycle." Real Estate Finance Today. No date.

Contour Software, Inc. "Detailed loan program report." Feb. 3, 1991.

Contour Software, Inc. "The Loan Finder." No date.

Contour Software, Inc. Re: <None>. Feb. 13, 1996.

GHR Systems, Inc. "Mars Interface Relationships." No date.

GHR Systems, Inc. "Overview of the MARS System." No date.

* cited by examiner

AUTOMATED LOAN APPROVAL SYSTEM

BACKGROUND OF THE INVENTION

1. Field of the Invention

The invention relates to an automated loan approval system.

2. Related Art

In the mortgage loan industry, brokers obtain borrower information from prospective borrowers, coordinate with prospective lenders, and attempt to match borrowers with lenders in response to borrower information. It would be advantageous for brokers and lenders to be able to coordinate effectively, rapidly, and at minimal cost.

In one known method, a broker enters information on a loan request to be approved by one or more lenders, lenders review that loan request and indicate terms at which they would approve that loan request, and the broker selects one such bid to accept. This method achieves the general goal of presenting loan requests, and obtaining information regarding the lender view of those loan requests, substantially automatically and at reduced cost.

This known method has the feature that lenders might end up reviewing or approving substantially more loans than the number that are actually completed. For just one example, multiple lenders might conditionally approve a specific loan request, but only one of those lenders will actually complete the loan.

This known method also has the feature that brokers actually submit loan requests to find out whether that loan would be approved, by whom, and at what cost. For just one example, brokers might wish to advise prospective borrowers without the commitment or difficulty of making a complete loan application, such as to advise prospective borrowers of the likely available loan rates for borrowers in similar circumstances.

SUMMARY OF THE INVENTION

The invention provides a method and system capable of automatic loan approval, in which lenders can both provide information to brokers regarding their loan policies, and in which brokers can obtain information regarding likely lender treatment of prospective borrowers. Thus, brokers search a database of possible loan programs made available by lenders, rather than lenders searching a database of possible loans made available by brokers.

In an aspect of the invention, lenders might provide for selected loan requests to be automatically approved (herein sometimes called an "automatic lock"), subject to selected conditions, or might provide for selected loan requests to be approved by a loan officer, again subject to selected conditions. Lenders can control automatic approval of loan requests in response to a set of loan approval business rules, either associated with selected loan programs, or associated with selected lender business units. The loan approval business rules might themselves be responsive to information about the prospective borrower, the submitting broker, the channel of trade or manner in which the loan request is made, or other information. In one embodiment, lenders might provide for substantial post-lock modification of the loan request, either without substantial alteration to the loan, or with alteration to the loan responsive to those post-lock modifications.

For one example, not intended to limit the breadth of the invention in any way, a lender might provide for automatic loan approval for selected loan programs for those borrowers having a credit score above a selected threshold, while requiring loan officer approval for those same loan programs for borrowers having a lesser credit score.

In an aspect of the invention, lenders can provide for loan approvals to be automatically adjusted, subject to selected conditions. Lenders can control automatic adjustment of loan requests in response to a set of loan adjustment business rules, either associated with selected loan programs, or associated with selected lender business units. The loan adjustment business rules might themselves be responsive to information about the prospective borrower, the submitting broker, the channel of trade or manner in which the loan request is made, or other information. Loan adjustment business rules might be associated with selected explanations, including information for the broker or borrower regarding why the adjustment was made, or what alterations might be made to the loan to make further adjustments.

For a first example, not intended to limit the breadth of the invention in any way, a lender might provide for automatic loan adjustment for selected loan programs in response to a LTV (loan to value) fraction, so that for example a loan rate might be adjusted downward (that is, to a less expensive loan) if the borrower contributes additional capital toward purchase of the property, with the effect of lowering the LTV fraction. For a second such example, a lender might provide for automatic loan adjustment for selected brokers having a history of successful loan performance, such as a low default rate or a low fraction of loans ultimately disapproved for lack of borrower documentation. The automatic adjustment might relate to reduced document or fee requirements for the loan program itself.

In an aspect of the invention, lenders can provide for loan approvals to be controlled in response to an organizational structure of the lender. Some lending organizations distinguish among distinct business units, distinct loan offices within those business units, or distinct loan officers or (in possible embodiments, loan evaluation teams) within those loan offices. Lenders can control both automatic approval of loan requests and automatic adjustment of loan requests in response to association of the loan with one or more such distinct elements within the lending organization.

For a first example, not intended to limit the breadth of the invention in any way, a lender might provide for automatic loan adjustment for selected loan programs for a selected business unit, due to special efficiency or possible inefficiency of that selected business unit. For a second such example, a lender might provide for a limit (denominated either in number of dollars or, in a possible embodiment, another measure such as a number of loans) to the amount of automated loan approvals allowed per day for a selected individual loan officer, or a global limit to the amount of automated loan approvals allowed per day for any loan officer, or any loan office, or for the lender as a whole.

In an aspect of the invention, brokers have the capability of searching loan programs on behalf of a borrower, and for manipulating search results so as to find a "best" loan program. Brokers might determine a "best" loan program in response to a specific interest rate available to the borrower, a loan origination fee (measured in points) associated with the loan program, an estimate of closing costs or other fees associated with the loan program, an estimate of the fee available to the broker, and the like. Brokers might select a subset of those loan programs found by search (such as for example in response to a specific interest rate available to the borrower) and determine which ones of those loan programs are "best" in response to prospective alteration of the loan request.

For example, not intended to limit the breadth of the invention in any way, a broker might search a loan program database on behalf of a borrower, finding many loan programs for which the borrower qualifies. The broker might then organize those loan programs in response to factors favorable to the borrower, with the effect of presenting a relatively smaller number of loan programs for the borrower to consider and select among.

In an aspect of the invention, brokers have the capability of searching loan programs on behalf of a borrower, and for altering the search parameters in response to possible loan programs that do not fall strictly within the search, but for which the borrower might qualify under altered circumstances. A result of searching a loan program database presents both "hits" (loan programs fully within search parameters requested by the broker), and "near hits" (loan programs not within search parameters requested by the broker, but which would be within those search parameters if altered). In one embodiment, brokers can interact with a search engine for the loan program database, with the effect of altering search parameters until the broker is satisfied with the search results.

For example, not intended to limit the breadth of the invention in any way, a broker might search a loan program database on behalf of a borrower, finding many loan programs for which the borrower qualifies. The broker might then organize those loan programs in response to factors favorable to the borrower, with the effect of presenting a relatively smaller number of loan programs for the borrower to consider and select among.

For one example, not intended to limit the breadth of the invention in any way, a broker might search for loan programs available to a borrower with a selected loan amount, LTV fraction, borrower income, and non-discretionary borrower expenses. Search results might include a first set of loan programs for which the borrower is qualified, or a second set of loan programs for which the borrower is not qualified, but could become qualified with adjustment to one or more search parameters. In possible embodiments, search results may include both the first set and the second set at once, possibly with some indicator to differentiate search results in first set from search results in the second set. The broker might adjust such search parameters until a loan program is found that is both acceptable to the borrower and for which the borrower can meet the requirements.

In embodiments of the invention, there might be one or more brokers, and there might be one or more lenders. Thus, the ratio of brokers to lenders might be many-to-one, one-to-one, one-to-many, or many-to-many.

INCORPORATED DISCLOSURES

Inventions described herein can be used in conjunction with technology described in the following documents:

U.S. Pat. No. 5,995,947, issued Nov. 30, 1999, in the name of Stephen FRASER, Sadashiv ADIGA, and Suresh PAYANKANNUR, titled "Interactive Mortgage and Loan Information and Real-Time Trading System", and applications claiming priority therefrom.

These documents are hereby incorporated by reference as if fully set forth herein, and are sometimes referred to herein as the "incorporated disclosures".

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

System Elements

Figure 1:
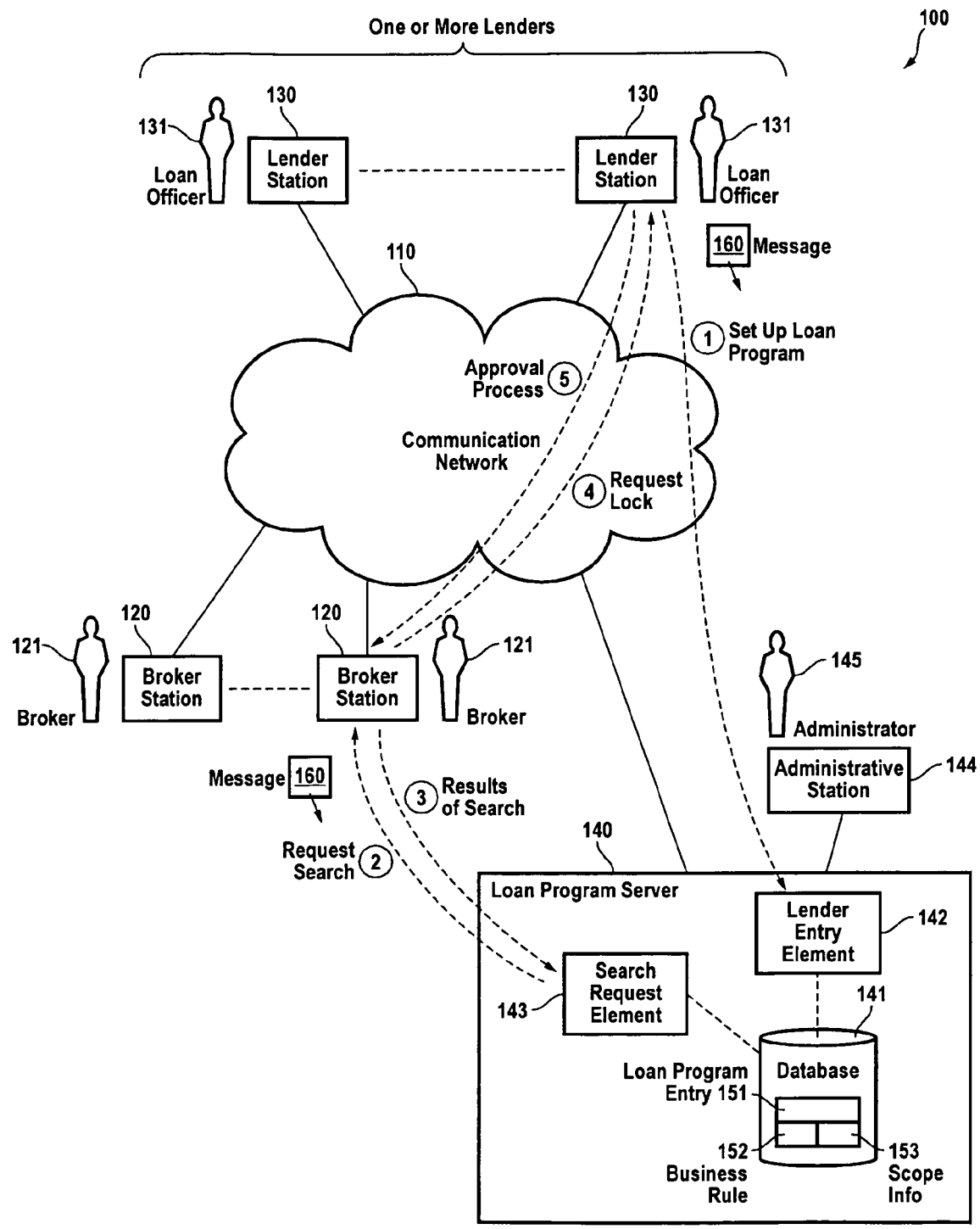
FIG. 1 shows a block diagram of an automated loan approval system.

FIG. 1 shows a block diagram of an automated loan approval system.

A system 100 includes a communication network 110, a set of broker stations 120, a set of lender stations 130, and a loan program server 140.

The communication network 110 includes a set of communication links, with the effect that any broker station 120, any lender station 130, and the loan program server 140, can intercommunicate. In one embodiment, the communication network 110 includes an Internet, or a subset of one. However, in alternative embodiments, the communication network 110 may include any system or technique by which intercommunication can take place, including an enterprise network, an extranet, a frame relay network, a LAN, an intranet, a private or public switched network, a virtual private network, and the like. In the context of the invention, there is no particular requirement that the communication network 110 is limited to any particular technique or technology.

Each broker station 120 includes a processor, program and data memory, an input device, and an output device, and is operated by a broker 121. In one embodiment, each broker station 120 includes a PC or other workstation. However, in alternative embodiments, each broker station 120 may include any system or technique by which the broker 121 might present search requests and review and process results of those search requests, including a laptop or notebook computer, and the like. In the context of the invention, there is no particular requirement that the broker station 120 is limited to any particular technique or technology.

In possible embodiments, each broker station 120 may alternatively indude a handheld computer or PDA, or a cellular telephone or pager with computing features, or the like. As noted above, in the context of the invention, there is no particular requirement that the broker station 120 is limited to any particular technique or technology.

In the context of the invention, there is also no particular requirement that the broker stations 120 are identical or even substantially similar to each other. Each broker station 120 can operate independently and can be different, so long as each can carry out the functions described herein with regard to interaction with the broker 121 and with other components of the system 100.

Similar to the broker stations 120, each lender station 130 includes a processor, program and data memory, an input device, and an output device, and is operated by a loan officer 131. In one embodiment, each lender station 130 includes a PC or other workstation. However, in alternative embodiments, each lender station 130 may include any system or technique by which the loan officer 131 might present search requests and review and process results of those search requests, including a laptop or notebook computer, and the like. In the context of the invention, there is no particular requirement that the lender station 130 is limited to any particular technique or technology.

Similar to the broker stations 120, in possible embodiments, lender station 130 may include a handheld computer or PDA, or a cellular telephone or pager with computing features, or the like. As noted above, in the context of the invention, there is no particular requirement that the lender station 130 is limited to any particular technique or technology.

The loan program server 140 includes a loan program database 141, a lender entry element 142, and a search request element 143.

The loan program server 140 also optionally includes an administrative workstation 144, similar to the broker stations 120 and the lender stations 130, with the capability of allowing an administrator 145 to make changes to operation of the loan program server 140, possibly including making changes to the loan program database 141.

The loan program database 141 includes a set of loan program entries 151, each of which includes business rule information 152 pertinent to an associated loan program. In one embodiment, such information includes:

- A set of loan program qualifying rules, such as responsive to borrower credit score, borrower income, loan amount, location of the underlying property or other asset, LTV fraction, possible government subsidies or preferences associated with the loan program, and the like.
- A set of automatic loan approval business rules, such as responsive to information about the prospective borrower (such as for example borrower credit score or borrower income), information about the submitting broker (such as history information for loans submitted by that broker), information about the channel of trade or manner in which the loan request is made (such as whether the loan was submitted using an EDI interchange technique, using an email request, using a fax, using a telephone request, or using a web link), and the like.
- A set of automatic loan adjustment business rules, such as responsive to information similar to information for which automatic loan approval business rules are responsive. In one embodiment, loan adjustment business rules have associated therewith a set of explanatory information, such as a text message explaining to the broker or borrower, or both, one or more reasons for the adjustment, and what alterations might be made to the loan to make further adjustments.

In one embodiment, each loan program entry 151 includes scope information 153 pertinent to its scope within the lender organization, with the effect that the loan program entry 151 will have effect only so far as its scope information 153 matches elements of the organizational structure of the lender. Scope information 153 can distinguish among distinct business units, distinct loan offices within those business units, or distinct loan officers or (in possible embodiments, loan evaluation teams) within those loan offices.

In operation of the system 100, the elements thereof have occasion to send and receive messages 160 of various types. As described herein, the lender stations 130 might send messages 160 directing the loan program server 140 to set up, change, or remove a loan program, possibly including creating a loan program entry 151, altering a selected loan program entry 151, or deleting a selected loan program entry 151, and possibly including such operations with regard to business rule information 152 or scope information 153 for a selected loan program entry 151.

Method of Operation

Figure 2:
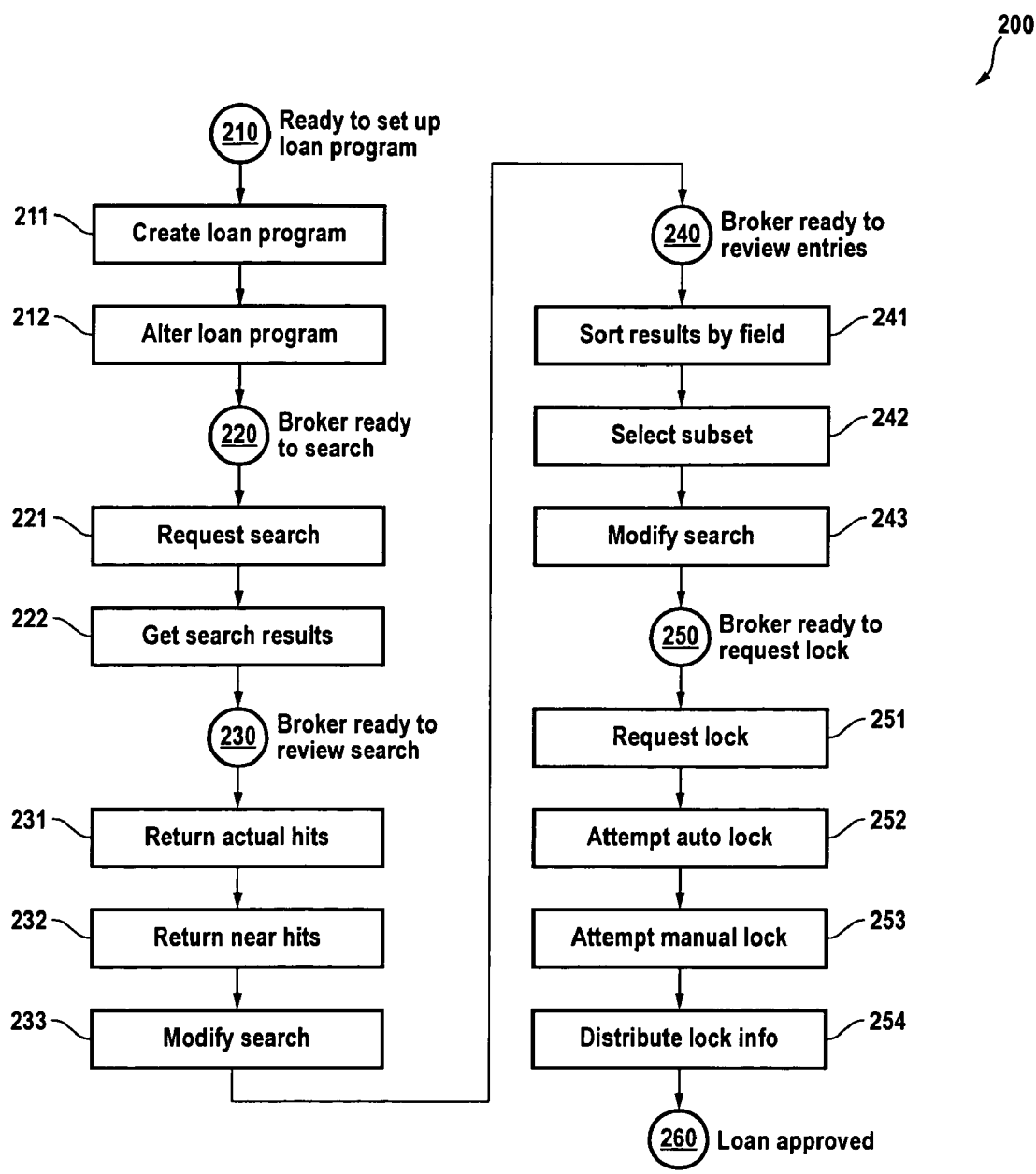
FIG. 2 shows a process flow diagram of a method of operating an automated loan approval system.

FIG. 2 shows a process flow diagram of a method of operating an automated loan approval system.

A method 200 is performed by the system 100. Although the method 200 is described serially, the flow points and steps of the method 200 can be performed by separate elements in conjunction or in parallel, whether asynchronously or synchronously, in a pipelined manner, or otherwise. There is no particular requirement that the method 200 must be performed in the same order in which this description lists flow points or steps, except where explicitly so indicated.

Loan Program Setup

At a flow point 210, a lender station 130 is ready to set up a loan program.

At a step 211, the lender station 130 sends a message 160 to the loan program server 140, requesting the latter to create a loan program entry 151. The lender entry element 142 at the loan program server 140 receives the message 160, performs the request, and responds to the lender station 130 with an acknowledgement. In the event of success, the acknowledgement so indicates. In the event of an error, the acknowledgement so indicates, and provides information regarding the nature of the error.

At a step 212, the lender station 130 sends a message 160 to the loan program server 140, requesting the latter to alter the loan program entry 151 to include selected information pertinent to the loan program, such as a set of business rule information 152 or scope information 153. Similar to the step 211, the lender entry element 142 at the loan program server 140 receives the message 160, performs the request and responds to the lender station 130 with an acknowledgement. In the event of success, the acknowledgement so indicates. In the event of an error, the acknowledgement so indicates, and provides information regarding the nature of the error.

Loan Program Search

At a flow point 220, a broker station 120 is ready to search for a loan program.

At a step 221, the broker station 120 sends a message 160 to the loan program server 140, requesting the latter to perform a search of the loan program database 141. Similar to the step 211, the search request element 143 at the loan program server 140 receives the message 160, performs the request, and responds to the broker station 120 with an acknowledgement. In the event of success, the acknowledgement so indicates. In the event of an error, the acknowledgement so indicates, and provides information regarding the nature of the error.

At a step 222, the search request element 143 at the loan program server 140 sends a message 160 including a set of search results to the broker station 120. The search results include a set of loan program entries 151 (or indices thereof, or pointers thereto) responsive to the search request from the previous step.

In one embodiment, the search results include:

- A set of loan programs, each indicating a loan program for which the borrower qualifies. In one embodiment, each loan program includes associated information relating to conditions, such as loan programs that are conditional on proof of borrower income or appraisal of the underlying property.
- A set of loan program adjustment values, each indicating an adjustment to the loan program, along with an associated reason for the adjustment. As a result of the loan program adjustment, an aspect of the loan program is altered. Aspects that might be altered include interest rate (either a fixed interest rate, or a base rate and a premium over an index rate for adjustable-rate loans), loan origination fees (sometimes referred to as "points"), and documentation and other fees. In one embodiment, the associated reason includes a text explanation of the alteration, such as for one possible example "POINTS WAIVED BECAUSE OF GOOD BORROWER CREDIT".

Modifiable Parameters

At a flow point 230, a broker station 120 is ready to review the search results.

In one embodiment, the search results include either actual "hits," that is, information from loan program entries 151 for which the borrower qualifies, or "near hits," that is, information from loan program entries 151 for which the borrower does not qualify, but for which the borrower could qualify if at least one of the search parameters was altered. In this embodiment, search parameters are divided into those search parameters that are modifiable, that is, for which the borrower could reasonably be expected to alter the search parameter, and those search parameters that are not modifiable. An example of a search parameter that is modifiable is LTV, because the borrower could contribute more capital toward purchase of the property. An example of a search parameter that is not modifiable is location of the property, because the borrower cannot generally move the property.

In one possible embodiment, the search results might include both the actual hits and the near hits. In this possible embodiment, the search results might be color-coded, highlighted, or otherwise differentiated upon display, to indicate which search results are for the actual hits and which are for the near hits.

At a step 231, the search request element 143 at the loan program server 140 sends a message 160 to the broker station 120, with complete information for those search results that are actual hits. The broker at the broker station 120 can display any element of the complete information, including rates, points, and fees charged according to the loan program entry 151.

At a step 232, the search request element 143 at the loan program server 140 sends a message 160 to the broker station 120, with only partial information for those search results that are near hits. The broker at the broker station 120 can display those elements for which the search parameters are modifiable. These search parameters are shown highlighted with the requirements for qualification only, so the broker at the broker station 120 can determine if the particular borrower is able to meet those requirements for qualification.

In one embodiment, modifiable parameters include: loan amount, LTV fraction, borrower income, and non-discretionary borrower expenses, and other parameters over which the borrower has a measure of control. Non-modifiable parameters include: borrower credit score, location of the property, and other parameters over which the borrower does not have a measure of control.

At a step 233, the broker at the broker station 120 modifies at least one of those parameters shown as modifiable, and sends a message 160 to the search request element 143 at the loan program server 140 with the modified search results.

These steps can be repeated until the broker at the broker station 120 finds an acceptable loan program entry 151 for which the borrower can meet the qualifications, or until the broker at the broker station 120 decides that no such acceptable loan program entry 151 exists.

Best Loan Program

At a flow point 240, a broker station 120 is ready to review those loan program entries 151 for which the borrower qualifies.

At a step 241, the broker directs the broker station 120 to order the search results in response to one or more data fields found in the search results. In one embodiment, the broker station 120 is capable of ordering the search results in response to at least one of these data fields: a specific interest rate available to the borrower, a loan origination fee (measured in points) associated with the loan program, an estimate of closing costs or other fees associated with the loan program, (and in one possible embodiment) an estimate of the fee available to the broker, and the like.

For example, not intended to limit the breadth of the invention in any way, the broker might direct the broker station 120 to order the search results by the interest rate available to the borrower. In this example, the broker station 120 would calculate the actual interest rate for variable-rate loan programs (in response to current market data, available from the loan program server 140 or from another source), so that the interest rate would be immediately apparent without the broker having to perform that calculation.

For another example, again not intended to limit the breadth of the invention in any way, (in one possible embodiment) the broker might direct the broker station 120 to order the search results by a blended value, such as a weighted value using both the specific interest rate available to the borrower and the loan origination fee. While this blended value is not necessarily a direct economic measure of the loan program, it might reflect the preference the borrower would have for its associated loan program.

At a step 242, the broker directs the broker station 120 to select a subset of those loan program entries 151, in response to the search results and the ordering of those search results from the previous step. For one example, not limiting in any way, the broker at the broker station 120 might select only those loan program entries 151 having a specific interest rate available to the borrower.

At a step 243, similar to the step 233, the broker at the broker station 120 modifies at least one of those parameters shown as modifiable, and sends a message 160 to the search request element 143 at the loan program server 140 with the modified search results.

Similar to the steps following the flow point 230, these steps can be repeated until the broker at the broker station 120 finds an acceptable loan program entry 151 for which the borrower can meet the qualifications, or until the broker at the broker station 120 decides that no such acceptable loan program entry 151 exists.

Lock Request

At a flow point 250, a broker station 120 is ready to request a lock for one or more selected loan program entries. If the broker does not wish to request any locks, the steps following this flow point are not performed.

At a step 251, the broker station 120 sends a message 160 requesting a lock (that is, a loan approval) for one or more selected loan program entries 151. Similar to the step 211, the loan program server 140 receives the message 160, and responds to the lender station 130 with an acknowledgement. In the event of success, the acknowledgement so indicates. In the event of an error, the acknowledgement so indicates, and provides information regarding the nature of the error.

At a step 252, the loan program server 140 attempts to perform an automatic lock (that is, an automatic loan approval) in response to the message 160 received in the previous step. The loan program server 140 reviews the business rule information 152 associated with the selected loan program entries 151 indicated in the message 160, and applies the automatic loan approval business rules found therein. If the automatic loan approval business rules allow for an automatic lock, the loan program server 140 responds to the broker station 120 with a responsive message 160 so indicating. If the automatic loan approval business rules do not allow for an automatic lock, the loan program server 140 responds to the broker station 120 with a responsive message 160 so indicating.

At a step 253, if the automatic lock was not allowed, the loan program server 140 sends a message 160 to a lender station 130 associated with the selected loan program entries 151, or indicated in the associated business rule information 152, or otherwise designated by the lender. In this step, the message 160 requests a manual lock (that is, review of the lock request by a loan officer at that lender station 130, and approval of the lock by the loan officer at that lender station 130). This step might include messages 160 between the selected lender station 130 and the broker station 120 requesting the lock, as part of a loan approval process performed by the lender and the broker.

At a step 254, if the lock was approved (whether automatically or manually), the communication network 110 distributes information associated with the loan approval (whether conditional or not) to the broker station 120, the lender station 130, and the loan program server 140, using messages 160. The broker station 120, the lender station 130, and the loan program server 140 update their records regarding the specific loan, and possibly regarding the specific loan program entry 151.

For one example, the loan program entry 151 might have associated business rule information 152 restricting a dollar amount of such loans that can be made (or in a possible embodiment, another measure such as an absolute number of such loans that can be made), or an amount of such loans that can be automatically locked, or an amount of such loans that can be automatically locked by a selected sub-unit of the lender. In such cases, the loan program server 140 updates the specific loan program entry 151 to indicate information regarding the specific loan that was made, such as its amount, the approving loan officer and sub-unit of the lender, and whether that specific loan was automatically locked or manually locked.

Loan Approval

At a flow point 260, the specific loan has been approved, and system 100 is ready to process another loan.

In embodiments of the invention, there might be one or more brokers, and there might be one or more lenders. Thus, the ratio of brokers to lenders might be many-to-one, one-to-one, one-to-many, or many-to-many.

Alternative Embodiments

Although preferred embodiments are disclosed herein, many variations are possible which remain within the concept, scope, and spirit of the invention. These variations would become clear to those skilled in the art after perusal of this application.

For just one example, not intended to limit the breadth of the invention in any way, the invention is applicable to all types of loans, including without limitation new home mortgages, home improvement loans, second mortgages, home equity lines of credit, construction loans, as well as to loans not related to real estate, such as new car loans, purchase money mortgages and related loans, business start up loans, business lines of credit, and the like. In the context of the invention, there is no particular requirement regarding the nature of the loan itself, or of the borrower, or of the lender.

Those skilled in the art will recognize, after perusal of this application, that these alternative embodiments are illustrative and in no way limiting.

The invention claimed is:

1. Apparatus including
a database of loan programs,
    said loan programs
        being associated with one or more possible lenders,
    each said loan program
        being associated with a set of loan approval rules;
a search element
    coupled to said database and
    responsive to at least one of
        a broker history of loan approvals,
        a broker history of loan performance,
    associated with a broker
    associated with said possible loan request; and
an automated approval element
    coupled to said search element and
    coupled to said loan approval rules.

2. Apparatus as in claim 1,
including
a governor
    coupled to said automated approval element,
    said governor
    being responsive to
        a measure of loan volume
        coupled to
        said automated approval element.

3. Apparatus as in claim 2,
wherein
said measure of loan volume
    is responsive to
    a set of loans approved
        by said automated approval element.

4. Apparatus as in claim 2,
wherein
said measure of loan volume
    is responsive to
    a set of loans approved
        in accordance with
        a selected set of loan programs.

5. Apparatus as in claim 2,
wherein
said measure of loan volume
    is responsive to
    a set of loans approved
        on behalf of
        at least one of
            a selected loan officer,
            a selected team of loan officers.

6. Apparatus as in claim 1,
including
a loan selection element
    coupled to
    an output of said search element, and
    responsive to
    a broker fee
        associated with a selected loan program;

wherein
said loan selection element
  has an output related to
    a statistical measure of
    at least one said broker fee.

7. Apparatus as in claim 1,
wherein said automated approval element
  is disposed for
    providing an automated lock
      for said loan request, and
  is responsive to
  a set of loan adjustment rules,
    said loan adjustment rules
      including a set of modifications
        to said automated lock,
      said modifications being applied
      after acceptance of said loan.

8. A method, including steps of
maintaining a database of loan programs,
  said loan programs
    being associated with
    one or more possible lenders,
  each said loan program
    being associated with
    a set of loan approval rules;
searching said database
  responsive to at least one of
    a broker history of loan approvals,
    a broker history of loan performance,
    associated with a broker
    associated with a possible loan request; and
providing automated approval
  of one or more
  selected said possible loan requests
  in response to
    said steps of searching.

9. A method as in claim 8,
including steps of
governing said steps of
  providing automated approval,
said steps of governing
  being responsive to
    a measure of loan volume
      processed by
      said steps of
      providing automated approval.

10. A method as in claim 9,
wherein
said measure of loan volume
  is responsive to
    a set of loans approved
      by said steps of
      providing automated approval.

11. A method as in claim 9,
wherein
said measure of loan volume
  is responsive to
    a set of loans approved
      in accordance with
      a selected set of loan programs.

12. A method as in claim 9,
wherein
said measure of loan volume
  is responsive to
    a set of loans approved
      on behalf of
      at least one of
        a selected loan officer,
        a selected team of loan officers.

13. A method as in claim 8,
including steps of
selecting one or more loans
  in response to
    said steps of searching, and
  in response to
    a broker fee
      associated with a selected loan program;
wherein
said steps of
selecting one or more loans
  have an output related to
    a statistical measure of
    at least one said broker fee.

14. A method as in claim 8,
wherein said steps of
providing automated approval
  include steps of
    providing an automated lock
      for said loan request, and
  are responsive to
  a set of loan adjustment rules,
    said loan adjustment rules
      including a set of modifications to said automated lock,
      said modifications being applied after acceptance of said loan.

\* \* \* \* \*